(12) United States Patent
Winter et al.

(10) Patent No.: US 10,826,684 B1
(45) Date of Patent: Nov. 3, 2020

(54) SYSTEM AND METHOD OF VALIDATING INTERNET OF THINGS (IOT) DEVICES

(71) Applicant: Syniverse Technologies, LLC, Tampa, FL (US)

(72) Inventors: Craig Winter, Felton, CA (US); Monique Jeanne Morrow, Zurich (CH)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/892,907

(22) Filed: Jun. 4, 2020

Related U.S. Application Data (60) Provisional application No. 62/858,099, filed on Jun. 6, 2019.

(51) Int. Cl.
*H04L 9/06* (2006.01)
*H04L 9/32* (2006.01)
(Continued)

(52) U.S. Cl.
CPC .......... *H04L 9/0637* (2013.01); *H04L 9/3236* (2013.01); *H04L 9/3297* (2013.01);
(Continued)

(58) Field of Classification Search
CPC ... H04L 2209/38; H04L 63/101; H04L 43/10; H04L 9/3297; H04L 9/3236; H04L 9/0637; H04W 84/18
See application file for complete search history.

(56) References Cited

U.S. PATENT DOCUMENTS

| 9,849,364 | B2 * | 12/2017 | Tran | G06K 9/00342 |
| 2017/0046664 | A1 * | 2/2017 | Haldenby | G06Q 20/4016 |

(Continued)

OTHER PUBLICATIONS

Search Query Report from IP.com (performed Aug. 12, 2020) (Year: 2020).*

(Continued)

*Primary Examiner* — Sharon S Lynch
(74) *Attorney, Agent, or Firm* — Molly L. Sauter; Smith & Hopen, P.A.

(57) ABSTRACT

A system and method for validating an Internet of Thing (IoT) device on an IoT network. The IoT device captures and stores the historical sensor values, along with corresponding timestamps in a local memory. A controller receives the historical sensor values and also receives a heartbeat token over a network that is different than the IoT network. The controller calculates a historical hash value using the historical sensor value and the heartbeat token as inputs and stores the historical hash values and the corresponding timestamp in a blockchain ledger of an IoT management platform. At a later time, in response to a validation request from the IoT management platform, the controller polls the IoT device for the historical sensor value associated with a particular timestamp. The IoT device responds with the stored historical sensor value and the controller calculates a reconstructed hash value using the historical stored sensor value and a stored heartbeat token as inputs. If the reconstructed hash value matches the historical hash value, the IoT device is validated.

20 Claims, 3 Drawing Sheets

(51) Int. Cl.
    *H04L 29/06*     (2006.01)
    *H04W 84/18*     (2009.01)
    *H04L 12/26*     (2006.01)

(52) U.S. Cl.
    CPC ............ *H04L 43/10* (2013.01); *H04L 63/101* (2013.01); *H04W 84/18* (2013.01); *H04L 2209/38* (2013.01)

(56) References Cited

U.S. PATENT DOCUMENTS

| | | | | |
|---|---|---|---|---|
| 2017/0232300 | A1* | 8/2017 | Tran | G06F 3/017 434/247 |
| 2017/0287090 | A1* | 10/2017 | Hunn | G06Q 50/18 |
| 2018/0218176 | A1* | 8/2018 | Voorhees | H04L 9/3213 |
| 2018/0302440 | A1* | 10/2018 | Hu | H04L 63/20 |
| 2018/0337769 | A1* | 11/2018 | Gleichauf | G06Q 20/065 |
| 2018/0375887 | A1* | 12/2018 | Dezent | H04L 67/30 |
| 2018/0376325 | A1* | 12/2018 | Xu | H04W 8/245 |
| 2019/0028865 | A1* | 1/2019 | Raleigh | G06Q 30/02 |
| 2019/0109713 | A1* | 4/2019 | Clark | H04L 9/3239 |
| 2019/0349190 | A1* | 11/2019 | Smith | H04L 69/18 |
| 2019/0349426 | A1* | 11/2019 | Smith | H04L 67/104 |
| 2019/0355025 | A1* | 11/2019 | Yang | H04L 9/0637 |
| 2020/0020038 | A1* | 1/2020 | Haile | A61B 5/6802 |
| 2020/0145216 | A1* | 5/2020 | Clark | H04L 63/12 |
| 2020/0167836 | A1* | 5/2020 | Yang | H04L 9/0637 |

OTHER PUBLICATIONS

Internet of Things white paper series, BOSCH Software Innovations GmbH. Nov. 1, 2016.

Sivanathan, A. et al., Classifying IoT Devices in Smart Environments Using Network Traffic Characteristics, IEEE Transactions on Mobile Computing, vol. 18, No. 8, pp. 1745-1759, Aug. 1, 2019.

* cited by examiner

SYSTEM AND METHOD OF VALIDATING INTERNET OF THINGS (IOT) DEVICES

CROSS-REFERENCE TO RELATED APPLICATIONS

This application claims priority to U.S. Provisional Patent Application No. 62/858,099, entitled "Method of Validating IOT Devices," filed Jun. 6, 2019, the entirety of which is incorporated herein by reference.

BACKGROUND OF THE INVENTION

Internet of Things (IoT) devices are become widely adopted and used in many critical applications. Some of the advantages and challenges associated with IoT devices are described in an Institute of Electrical and Electronics Engineers (IEEE) journal article entitled Classifying IoT Devices in Smart Environments Using Network Traffic Characteristics by Sivanathan, et. al, published Aug. 20, 2018, which is incorporated herein by reference. It is imperative that IoT devices, and the associated controllers, are secured against security breaches, including spoofing, insertion of fraudulent IoT devices into a network, and device, controller, node, or server takeover. If an IoT device is taken over or spoofed (i.e., replaced by an imposter device), erroneous data and/or a flood of data can be inserted into a network control system causing multiple issues including false alarms, denial of service attacks, extraction of sensitive data, and loss of control over connected devices. Furthermore, if network connected devices or controllers are compromised, they can be used to send damaging and dangerous commands to other connected devices and block alarms and alerts that should be sent to monitoring systems and administrators.

As the use of IoT devices used in cars, medical devices, and power grids increases, the damage that could be caused by a security breach could be catastrophic for both safety and privacy. Thus, there exists a strong, but previously unresolved need for a method of reliably and efficiently validating IoT devices and their associated controllers.

SUMMARY OF THE INVENTION

In various embodiments, the present invention provides a system and method for validating IoT devices and associated controllers prior to allowing the devices access to the IoT network.

In one embodiment, the present invention provides a method for validating an Internet of Things (TOT) device on an IoT network. The method includes, calculating, at a controller of an IoT network, a historical hash value based upon at least one historical sensor value stored at an IoT device of the IoT network and a heartbeat token received over a backchannel network that is different than the IoT network, the historical sensor value having a corresponding timestamp. The method further includes, storing the historical hash value and the corresponding timestamp in a blockchain ledger at an IoT management platform. The operation of the controller further includes, receiving a validation request for the IoT device from an IoT management platform, wherein the validation request includes an earlier timestamp and the corresponding historical hash value previously stored in the blockchain ledger, polling the IoT device to provide the historical sensor value associated with the earlier timestamp of the validation request, retrieving the heartbeat token associated with the earlier timestamp of the validation request and calculating, at the controller, a reconstructed hash value based upon the historical sensor value provided by the IoT device and the heartbeat token associated with the earlier timestamp from the validation request. The method additional includes, comparing the historical hash value stored in the blockchain ledger and the reconstructed hash value, and if the historical hash value matches the reconstructed hash value, determining that the IoT device is valid or if the historical hash value does not match the reconstructed has j value, identifying the IoT device as blacklisted in the blockchain ledger.

In an additional embodiment, the present invention provides a system for validating an Internet of Things (TOT) device on an IoT network. The system includes, a controller of an IoT network, the controller to calculate a historical hash value based upon at least one historical sensor value stored at an IoT device of the IoT network and a heartbeat token received over a backchannel network that is different than the IoT network, the historical sensor value having a corresponding timestamp. The system further includes, an IoT management platform to store the historical hash value and the corresponding timestamp in a blockchain ledger. The controller is further configured to receive a validation request for the IoT device from the IoT management platform, wherein the validation request includes an earlier timestamp and the corresponding historical hash value previously stored in the blockchain ledger, to poll the IoT device to provide the historical sensor value associated with the earlier timestamp of the validation request, to retrieve the heartbeat token associated with the earlier timestamp of the validation request and to calculate a reconstructed hash value based upon the historical sensor value provided by the IoT device and the heartbeat token associated with the earlier timestamp from the validation request. The IoT management platform is further configured to compare the historical hash value stored in the blockchain ledger and the reconstructed hash value, and if the historical hash value matches the reconstructed hash value, determine that the IoT device is valid or if the historical hash value does not match the reconstructed hash value, identify the IoT device as blacklisted in the blockchain ledger.

The invention further provides, a non-transitory computer-readable storage medium comprising computer-readable instructions which, when executed by one or more processors, cause the one or more processors to perform a method of validating an Internet of Things (TOT) device on an IoT network. The instructions comprising, calculating, at a controller of an IoT network, a historical hash value based upon at least one historical sensor value stored at an IoT device of the IoT network and a heartbeat token received over a backchannel network that is different than the IoT network, the historical sensor value having a corresponding timestamp, storing the historical hash value and the corresponding timestamp in a blockchain ledger at an IoT management platform, receiving, at the controller, a validation request for the IoT device from an IoT management platform, wherein the validation request includes an earlier timestamp and the corresponding historical hash value previously stored in the blockchain ledger, polling the IoT device to provide the historical sensor value associated with the earlier timestamp of the validation request, retrieving the heartbeat token associated with the earlier timestamp of the validation request, calculating, at the controller, a reconstructed hash value based upon the historical sensor value provided by the IoT device and the heartbeat token associated with the earlier timestamp from the validation request and comparing the historical hash value stored in the blockchain ledger and the reconstructed hash value, and if the historical hash value matches the reconstructed hash value, determining that the IoT device is valid or if the historical hash value does not match the reconstructed hash value, identifying the IoT device as blacklisted in the blockchain ledger.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE INVENTION

The Internet of Things (IoT) is a network of physical objects or devices, where the devices are specially designed to perform a specific function, unlike general computing devices like a desktop or laptop computer. IoT devices are embedded with electronics and network connectivity that enables the devices to collect, store and exchange data. The network connectivity may include, for example, Bluetooth™ connectivity, Wi-Fi connectivity, and/or cellular network connectivity. An IoT device may additionally include one or more of various types of sensors. An IoT may be controlled remotely within the IoT network infrastructure and the IoT device may use the network connectivity to communicate with other IoT devices, or with certain nodes over the Internet.

The disclosed invention addresses the problem of validating IoT devices and associated controllers. IoT devices may include various types of sensors executing embedded sensor functions. Communications with IoT devices can be established using wireless networks. A mobile SIM may be an example of an IoT entity in addition to "smart" appliances such as light bulbs, cameras, heart monitors, cars, building energy devices and so on.

In various embodiments, the present invention provides a system and method for preventing spoofed IoT devices from accessing IoT network data or causing denial of service/bot net style attacks on the IoT network. By using a faked identity such as the MAC (media access control) or IP (internet protocol) address of a legitimate IoT device, a spoofed IoT device can claim to be another legitimate IoT device. The spoofed IoT device can then gain illegal access to the IoT network and launch more advanced attacks, such as man-in-the-middle attacks and denial-of-service attacks In another aspect, the present invention extends private wireless networking into IoT. For example, Fog Distributed Architecture can enable the anti-spoofing and proof of history functions to be embedded into the edge gateways and IoT device controllers. Additionally, the application of Zero Knowledge Proof mechanisms may be applied to prevent actual device IDs and sensor data leakage following a device-header anti-tampering verification process.

Figure 1:
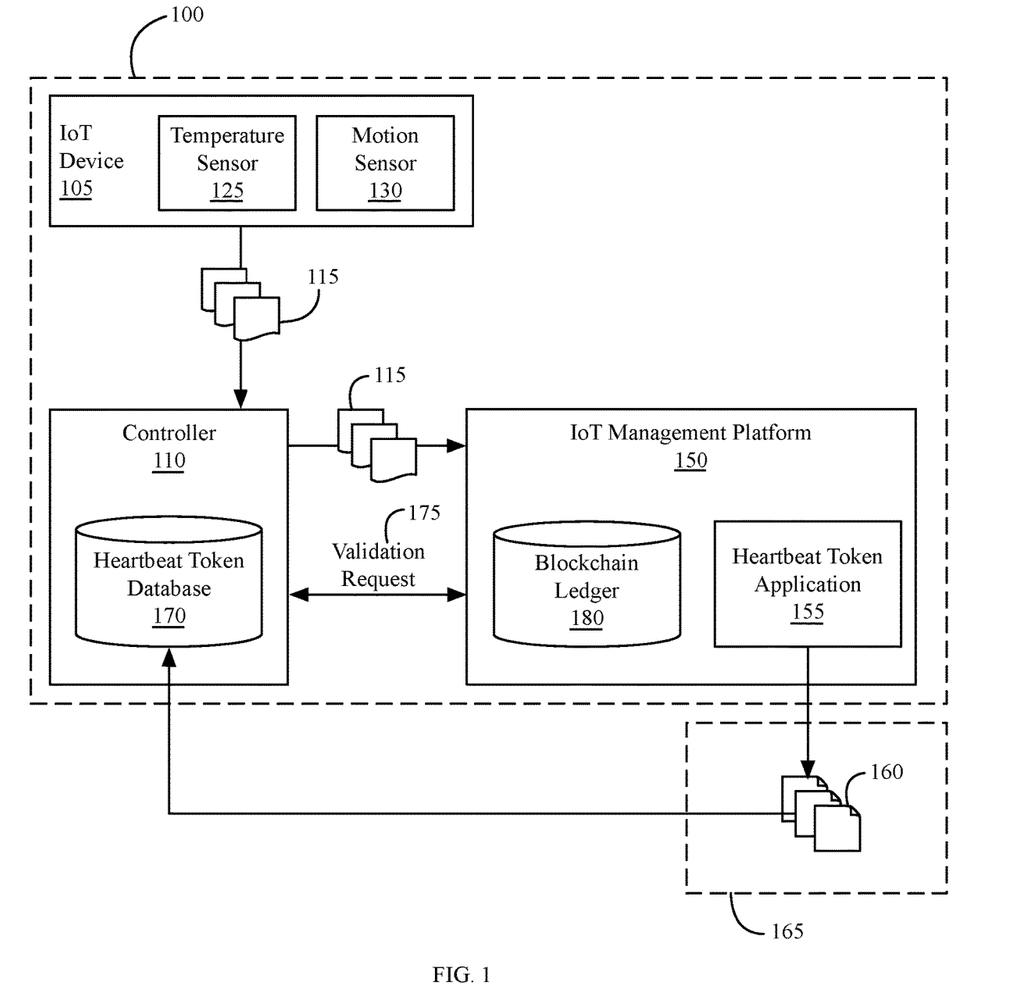
FIG. 1 is a block diagram schematically depicting an embodiment of a system for validating an IoT device in an IoT network, in accordance with an embodiment of the present invention.

Referring now to FIG. 1, in an IoT network 100 in accordance with an embodiment of the present invention, an IoT device 105 is in communication with a controller 110 and the controller is in communication with an IoT Management Platform 150. The IoT device 105 is configured to transmit data 115, such as sensor readings, to the controller 110. While one IoT device 105 is illustrated in this exemplary network 100, this is not intended to be limiting and it is known that numerous IoT devices may be present in the IoT network 100.

Each IoT device 105 in the IoT network 100 is assigned a unique identifier (UID) that is recorded in a blockchain ledger 180 of the IoT Management Platform 150. The blockchain ledger 180 also includes a list of blacklisted UIDs and the controller 110 is configured to check the UID of the IoT device 105 against the list of blacklisted UIDs stored in the blockchain ledger 180 to ensure that the IoT device 105 is not a known "bad" actor. If the UID of the IoT device 105 is blacklisted, the controller 110 will deny the IoT device 105 access to the IoT network 100 and may additionally notify a network administrator that a blacklisted IoT device 105 has attempted to access the IoT network 100. If the UID of the IoT device 105 is not on the list of blacklisted devices stored in the blockchain ledger 180, then the IoT device 105 is validated by the controller 110 and can be registered on the IoT network 100.

The IoT device 105 may have one or more sensors configured to detect or measure one or more predefined physical properties and/or environmental conditions. For example, the IoT device 105 may includes a temperature sensor 125 for measuring the temperature at the IoT device 105 and a motion sensor 130 for detecting the presence or absence of motion at the location of the IoT device 105. The illustrated temperature sensor 125 and motion sensor 130 of the IoT device 105 are exemplary and various other types sensors are within the scope of the invention, including, but not limited to, sensors for measuring the amount of light or pressure at the location of the IoT device 105 or sensors for determining the state of a battery of the IoT device 105. The IoT device 105 is configured to transmit the sensor reading values, which include environmental values and optionally other device status related data 115, such as signal strength and battery level, to the controller 110. The IoT device 105 keeps track of the history of its sensor readings (i.e. data 115) by storing them locally in memory circuitry of the IoT device 105, along with their associated timestamps. The timestamps may be a sequence of characters or encoded information that identify when each of the sensor readings were taken at the IoT device 105. Timestamps typically provide date and time of day, sometimes accurate to a small fraction of a second.

The invention further includes an IoT Management Platform 150 which communicates with the controller 110 and has access to the blockchain ledger 180. In an exemplary embodiment, the IoT Management Platform 150, or another authorized node, includes a heartbeat token application 155 that periodically generates heartbeat tokens 160. The heartbeat tokens 160 are transmitted to the controller 110 via a backchannel network 165. The backchannel network 165 is separate from the IoT network 100 that is used to transmit IoT device sensor data 115 to the controller 110. For example, the backchannel network 165 could be a private wireless network, while the IoT network 100 may be a public Internet. Transmission of the heartbeat tokens 160 from the IoT Management Platform 150 to the controller 110 over the backchannel network 165 provides an extra layer of security. Even if the IoT network 100 and/or the controller 110 is compromised, the validation method, described in detail below, would fail without access to the backchannel network 165 because the controller 110 must periodically prove that it has received a correct heartbeat token 160 at a predefined time. The controller 110 keeps track of the received heartbeat tokens 160, which are stored in a heartbeat token database 170.

With reference to FIG. 1, in operation of an exemplary embodiment of the present invention, the controller 110 receives sensor data 115 from the IoT device 105. The controller 110 also receives one or more heartbeat tokens 160 from the IoT Management Platform 150 via the backchannel network 165, as explained above. The controller 110 is configured to periodically calculate a historical hash value using a predefined number of most recent sensor readings 115 from the IoT device 105 and the one or more heartbeat tokens 160 from the IoT Management Platform 150 as inputs to the historical hash function used to generate the historical hash value. The calculated historical hash value is recorded in the main blockchain ledger 180, which is only accessible by the IoT Management Platform 150 and authorized nodes. In the main blockchain ledger 180, the recorded historical hash value is associated with the UID of the IoT device 105, whose sensor data 115 was used as an input to the hash function, and its corresponding timestamp.

Periodically, in a predefined sequence or at random, the IoT Management Platform 150 initiates a validation check toward the controller 110. The validation check management resides in the controller 110, the IoT Management Platform 150, and possibly other gateway devices. As such, it is not necessary for the IoT device to include logic for performing the validation check. In performing the validation check, the IoT Management Platform 150 issues a validation request 175 to the controller 110 associated with the IoT device 105. The validation request 175 is based on a randomly-selected timestamp/hash value pair that was previously recorded in the main blockchain ledger 180. The IoT Management Platform 150 sends the selected timestamp and UID of the IoT device 105 to the controller 110, and the controller 110 must independently calculate a reconstructed hash value that must match the previously calculated historical hash value associated with the timestamp, as recorded in the main blockchain ledger 180.

Responsive to receiving the validation request 175 from the IoT Management Platform 150, the controller 110 polls the IoT device 105, corresponding to the UID provided by the IoT Management Platform 150, for its stored sensor readings associated with the time indicated by the timestamp provided by the IoT Management Platform 150. The IoT device 105 responds to the poll from the controller 110 by providing the requested past sensor readings associated with the timestamp. The controller 110 also retrieves the stored heartbeat token stored in the heartbeat token database 170 that corresponds to the timestamp. The controller 110 calculates the reconstructed hash value using the received sensor reading values stored by the IoT device 105 and the retrieved heartbeat token from the heartbeat token database 170 as inputs to the hash function. Then, the controller 110 responds to the validation challenge from the IoT Management Platform 150 with the reconstructed hash value. The IoT Management Platform 150 compares the reconstructed hash value, which is calculated using the historical sensor values 115 stored by the IoT device 105 and the heartbeat token stored by the controller 110, with the historical hash value recorded in the main blockchain ledger 180, which was previously calculated using the historical sensor data from the IoT device 105 at the time indicated in the timestamp.

In the next step, if the reconstructed hash value calculated by the controller 110 and the historical hash value recorded in the main blockchain ledger 180 match, then the validation check is deemed to be successful. A successful validation check indicates that the polled IoT device 105 provided correct historic values of its sensor readings at the time stated in the timestamp. A rogue IoT device would have no knowledge of past sensor values or communications with other devices, nodes or controllers and, therefore, would be unable to pass the validation check. A rogue or compromised controller would not have access to the backchannel network 165 and, therefore, would have no knowledge of or access to past heartbeat tokens, and therefore would also be unable to pass the validation check. Thus, if either the IoT device 105 or the controller 110 are spoofed or otherwise compromised, the controller 110 would not be able to provide the IoT Management Platform 150 with a correct second hash, thereby triggering a red flag condition.

A successful validation check indicates that the controller 110 has access to the correct stored heartbeat token and the IoT device 105 has knowledge of the correct past sensor readings. When these two conditions are met, the reconstructed hash value will match the historical hash value recorded in the main blockchain ledger 180 of the IoT Management Platform 150.

The validation check described above is performed periodically and continuously for every IoT device on the IoT network 100. If the reconstructed hash value calculated by the controller 110 matches the historical hash value recorded in the main blockchain ledger 180, the successful result of the validation check is recorded in the main blockchain ledger 180.

On the other hand, if the controller 110 responds to the validation challenge from the IoT Management Platform 150 with a reconstructed hash value that does not match the historical hash value stored in the main blockchain ledger, then the validation check will be deemed failed. A failed validation check means that the IoT device 105 has been compromised or that the controller 110 failed to receive a correct heartbeat signal, or both. The IoT Management Platform 150 will take appropriate action by denying the controller 110 and/or the IoT device 105 access to the network and recording the blacklisted device in the blockchain and notifying the network administrator.

Figure 2:
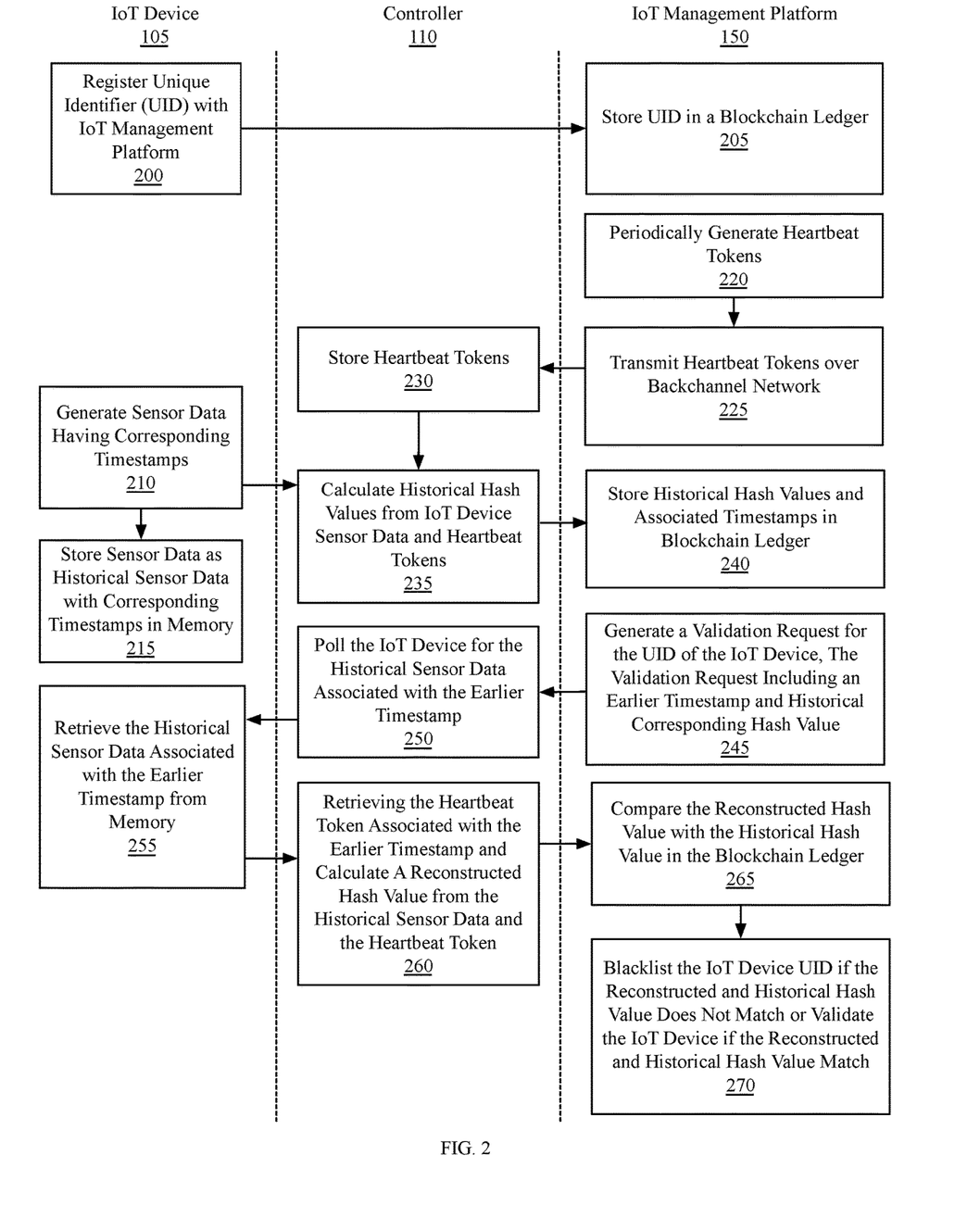
FIG. 2 is a swim-diagram illustrating the logic flow of a method for validating an IoT device in an IoT network, in according to an embodiment of the invention.

FIG. 2 is a swim-diagram of an exemplary process for validating IoT devices in an IoT network. For example, the process can be implemented by a IoT device 105, a controller 110 and an IoT Management Platform 150. FIG. 2 illustrates lanes for steps that can be performed by the IoT device 105, the controller 110 and the IoT Management Platform 150.

The IoT device 105, registers 200 itself with the IoT Management Platform 150 using a unique identifier (UID) of the IoT device 105. The IoT Management Platform 150 stores the UID of the IoT device in a blockchain ledger 205 when the IoT device 105 is registered. The IoT device 105 then generates sensor data values having corresponding timestamps 210. The IoT device 105 then stores the generates sensor data as historical sensor data in a local memory 215.

The IoT Management Platform 150 periodically generates heartbeat tokens 220 and transmits the heartbeat tokens over a backchannel network 225 to the controller 110. The controller 110 receives the heartbeat tokens from the IoT Management Platform 150 and also receives the historical sensor data and corresponding time stamps from the IoT device 105. The controller 110 then calculates historical hash values from the IoT device sensor data and the heartbeat tokens 230. The historical hash values calculated by the controller 110 are then stored in the blockchain ledge along with the corresponding timestamp 235.

After a period of time, the IoT Management Platform 150 generates a validation request for the IoT device 105 UID, which include an earlier timestamp that was stored in the blockchain ledger 240. In response to the validation request, the controller 110 polls the IoT device for the historical sensor data that is associated with the earlier timestamp 245. The IoT device 105 retrieves the historical sensor data associated with the earlier timestamp from its local memory 250 and provides the historical sensor data to the controller 110.

Upon receipt of the historical sensor data, the controller 110 retrieves the heartbeat token associated with the earlier timestamp and calculates a reconstructed hash value from the historical sensor data and the heartbeat token 225. The IoT Management Platform 150 then compares the reconstructed hash value with the historical hash value in the blockchain ledger 260. Based upon the results of the comparison, the IoT device 105 is then blacklisted if the reconstructed hash value does not match the historical hash value or the IoT device 105 is validated if the reconstructed hash value matches the historical hash value 265. The controller 110 and/or the IoT device 105 are either allowed or denied access to the IoT network based upon the results of the comparison.

Figure 3:
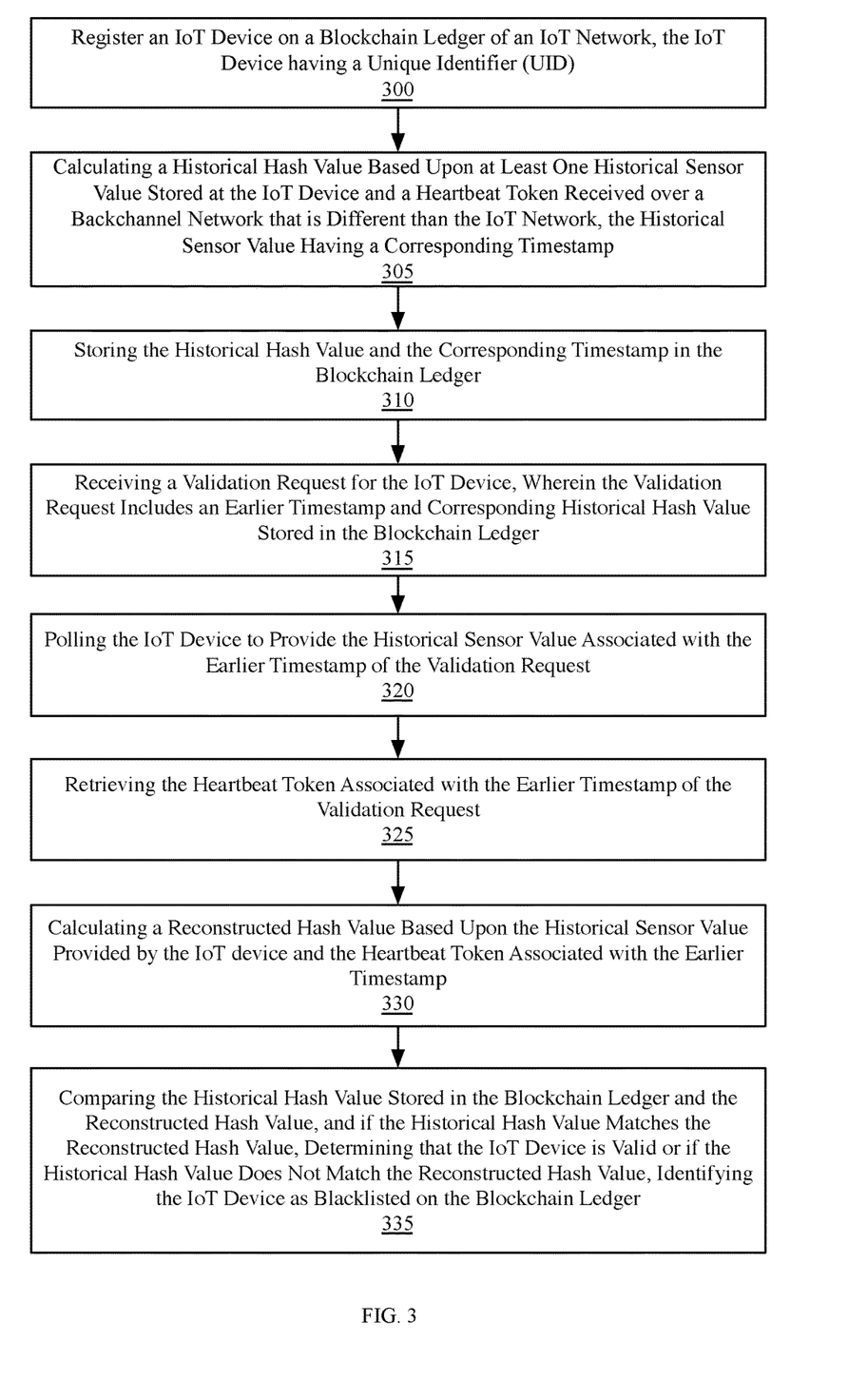
FIG. 3 is a flow diagram illustrating the method steps for validating an IoT device in an IoT network, in accordance with an embodiment of the present invention.

A flow diagram illustrating the method steps of an embodiment of the present invention are shown in FIG. 3.

At operation 300, the method includes, registering an IoT device on a blockchain ledger of an IoT network, the IoT device having a unique identifier (UID). In the present invention, the blockchain ledger is positioned at an IoT Management Platform 150, as shown in FIG. 1.

At operation 305, the method includes, calculating a historical hash value based upon at least one historical sensor value stored at the IoT device and a heartbeat token received over a different network than the IoT network, the historical sensor value having a corresponding timestamp. In one embodiment, a controller 110 calculates the historical hash value.

At operation 310, the method includes, storing the historical hash value and the corresponding timestamp in the blockchain ledger.

The controller 110 then performs operations 315, 320, 325 and 330. At operation 315, the method includes, receiving a validation request for the IoT device, wherein the validation request includes an earlier timestamp stored in the blockchain ledger. At operation 320, the method includes, polling the IoT device to provide the historical sensor value associated with the earlier timestamp of the validation request. At operation 325, the method includes, retrieving the heartbeat token associated with the earlier timestamp of the validation request and at operation 330, the method includes, calculating a reconstructed hash value based upon the historical sensor value provided by the IoT device and the heartbeat token associated with the earlier timestamp.

At operation 335, the IoT Management Platform 150 compares the historical hash value stored in the blockchain ledger and the reconstructed hash value. If the historical hash value matches the reconstructed hash value, then it is determined that the IoT device is valid. Alternatively, if the historical hash value does not match the reconstructed hash value, then the IoT device is blacklisted on the blockchain ledger.

In an additional embodiment, an IoT device forensic function may be performed prior to operation 300 for registering the IoT device on the blockchain ledger of the IoT network. It may be necessary to perform an IoT device forensic function if the IoT device is hacked or experiences a catastrophic re-boot during the process for registering the IoT device resulting in a valid status being posted to the blockchain, when in fact, the IoT device should be blacklisted as a compromised device.

In one scenario, when an IoT device is hacked mid-way in the process, the hacked IoT device may begin generating new fake sensor values, but the historical sensor values stored at the IoT device have not been tampered with. The risk is that the IoT device may pass the validation process and the new fake sensor values would be accepted and considered to be valid for the subsequent validity checks. As such, in this scenario, the validity checking process will fail in detecting the hacked IoT device.

In another scenario, if an IoT device has not been hacked, but instead experiences a restart during the validation process (for various reasons) and the historical sensor value is lost, the IoT device will fail to pass the validation process and be incorrectly identified as a blacklisted device on the blockchain ledger.

To address the two scenarios above, an IoT device forensic function may be performed prior to registering the IoT device on the blockchain ledger. The IoT device forensic function is performed by the controller 110 employing various cloud applications which incorporate big data analysis, robust sensor data check, traffic patterns and abnormality detections. The results of the IoT device forensic function are then stored as forensic function results in the blockchain ledger. Following the IoT device forensic function, the validation procedure can continue as shown in FIG. 3, resulting to a valid or blacklisted posting to the blockchain ledger.

As such, if the IoT device experiences a catastrophic re-boot, the forensic function results for the IoT device that are stored in the blockchain ledger are compared to the current forensic function results at the time of re-boot. If the forensic function results stored in the blockchain ledger do not match the current forensic function results for the IoT device, then the IoT device will be logged as blacklisted for a predetermined period of time and flagged as "potentially compromised" status, along with an associated timestamp, which is posted to the blockchain ledger.

Additionally, if the forensic function results for the IoT device that are stored in the blockchain ledger match the current forensic function results at the time of re-boot, then a "fetch" function is performed to the blockchain ledger to restore the historical sensor values to the IoT device, thereby allowing the validation procedure for the IoT device to continue as illustrated in FIG. 3.

As such, in various embodiments, the present invention provides a system and method for validating an Internet of Thing (IoT) device on an IoT network. The IoT device captures and stores the historical sensor values, along with corresponding timestamps in a local memory. A controller receives the historical sensor values and receives a heartbeat token over a network that is different than the IoT network. The controller calculates a historical hash value using the historical sensor value and the heartbeat token as inputs and stores the historical hash values and the corresponding timestamp in a blockchain ledger of an IoT management platform. At a later time, in response to a validation request from the IoT management platform, the controller polls the IoT device for the historical sensor value associated with a particular timestamp. The IoT device responds with the stored historical sensor value and the controller calculates a reconstructed hash value using the historical stored sensor value and a stored heartbeat token as inputs. If the reconstructed hash value matches the historical hash value, the IoT device is validated. The various embodiments of the present invention ensure that both the IoT device and the controller are valid prior to allowing access of the devices to the IoT Network.

Hardware and Software Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

While methods, apparatuses, and systems have been described in connection with exemplary embodiments of the various figures, it is to be understood that other similar embodiments can be used or modifications and additions can be made to the described embodiments for performing the same function without deviating therefrom. Therefore, the invention should not be limited to any single embodiment, but rather should be construed in breadth and scope in accordance with the appended claims.

What is claimed is:

1. A method for validating an Internet of Things (IOT) device on an IoT network, the method comprising:
    calculating, at a controller of an IoT network, a historical hash value based upon at least one historical sensor value stored at an IoT device of the IoT network and a heartbeat token received over a backchannel network that is different than the IoT network, wherein the historical sensor value has a corresponding timestamp and wherein the historical sensor value comprises one or more of a physical property and an environmental condition detected at the IoT device;
    storing the historical hash value and the corresponding timestamp in a blockchain ledger at an IoT management platform;
    receiving, at the controller, a validation request for the IoT device from an IoT management platform, wherein the validation request includes an earlier timestamp and the corresponding historical hash value previously stored in the blockchain ledger;
    polling the IoT device to provide the historical sensor value associated with the earlier timestamp of the validation request;
    retrieving the heartbeat token associated with the earlier timestamp of the validation request;
    calculating, at the controller, a reconstructed hash value based upon the historical sensor value provided by the IoT device and the heartbeat token associated with the earlier timestamp from the validation request; and
    comparing the historical hash value stored in the blockchain ledger and the reconstructed hash value, and when the historical hash value matches the reconstructed hash value, determining that the IoT device is valid or when the historical hash value does not match the reconstructed hash value, identifying the IoT device as blacklisted in the blockchain ledger.

2. The method of claim 1, further comprising, the IoT device capturing the at least one historical sensor value and storing the historical sensor value in a memory at the IoT device.

3. The method of claim 1, wherein calculating the historical hash value and storing the historical hash value in the blockchain ledger is performed periodically based upon a predetermined configurable frequency.

4. The method of claim 1, wherein the IoT network is the Internet and the backchannel network is a private wireless network.

5. The method of claim 1, further comprising, generating the validation request for the IoT device at the IoT management platform, wherein the validation request includes the earlier timestamp and the corresponding historical hash value in a data packet header designating a unique identifier (UID) of the IoT device.

6. The method of claim 5, wherein the earlier timestamp and the corresponding historical hash value are randomly selected by the IoT management platform.

7. The method of claim 5, wherein the validation request is generated based upon a predetermined configurable frequency.

8. The method of claim 1, further comprising registering a unique identifier (UID) for the IoT device and storing the UID in the blockchain ledger.

9. The method of claim 8, wherein identifying the IoT device as valid further comprises identifying the UID of the IoT device as a valid IoT device in the blockchain ledger and further comprising, the controller allowing the valid IoT device to access the IoT network.

10. The method of claim 8, wherein identifying the IoT device as blacklisted in the blockchain ledger further comprises identifying the UID of the IoT device as a blacklisted IoT device in the blockchain ledger and further comprising, the controller preventing the blacklisted IoT device from accessing the IoT network.

11. A system for validating an Internet of Things (IOT) device on an IoT network, the system comprising:
    a hardware controller of an IoT network, the controller to calculate a historical hash value based upon at least one historical sensor value stored at an IoT device of the IoT network and a heartbeat token received over a backchannel network that is different than the IoT network, wherein the historical sensor value has a corresponding timestamp and wherein the historical sensor value comprises one or more of a physical property and an environmental condition detected at the IoT device;

an IoT management platform to store the historical hash value and the corresponding timestamp in a blockchain ledger;

the controller further to receive a validation request for the IoT device from the IoT management platform, wherein the validation request includes an earlier timestamp and the corresponding historical hash value previously stored in the blockchain ledger, to poll the IoT device to provide the historical sensor value associated with the earlier timestamp of the validation request, to retrieve the heartbeat token associated with the earlier timestamp of the validation request and to calculate a reconstructed hash value based upon the historical sensor value provided by the IoT device and the heartbeat token associated with the earlier timestamp from the validation request; and the IoT management platform to compare the historical hash value stored in the blockchain ledger and the reconstructed hash value, and when the historical hash value matches the reconstructed hash value, determine that the IoT device is valid or when the historical hash value does not match the reconstructed hash value, identify the IoT device as blacklisted in the blockchain ledger.

12. The system of claim 11, wherein calculating the historical hash value and storing the historical hash value in the blockchain ledger is performed periodically based upon a predetermined configurable frequency.

13. The system of claim 11, wherein the IoT network is the Internet and the backchannel network is a private wireless network.

14. The system of claim 11, wherein the validation request includes the earlier timestamp and the corresponding historical hash value in a data packet header designating a unique identifier (UID) of the IoT device.

15. The system of claim 14, wherein the earlier timestamp and the corresponding historical hash value are randomly selected by the IoT management platform.

16. The system of claim 14, wherein the validation request is generated based upon a predetermined configurable frequency.

17. The system of claim 11, wherein the IoT management platform is further to register a unique identifier (UID) for the IoT device and store the UID in the blockchain ledger.

18. The system of claim 17, wherein the controller is further to identify the UID of the IoT device as a valid IoT device in the blockchain ledger and to allow the IoT device to access the IoT network when the IoT device has been identified as a valid IoT device.

19. The method of claim 17, wherein the controller is further to identify the UID of the IoT device as a blacklisted IoT device in the blockchain ledger and to prevent the blacklisted IoT device from accessing the IoT network.

20. A non-transitory computer-readable storage medium comprising computer-readable instructions which, when executed by one or more processors, cause the one or more processors to perform a method of validating an Internet of Things (IOT) device on an IoT network, the instructions comprising:

calculating, at a controller of an IoT network, a historical hash value based upon at least one historical sensor value stored at an IoT device of the IoT network and a heartbeat token received over a backchannel network that is different than the IoT network, wherein the historical sensor value has a corresponding timestamp and wherein the historical sensor value comprises one or more of a physical property and an environmental condition detected at the IoT device;

storing the historical hash value and the corresponding timestamp in a blockchain ledger at an IoT management platform;

receiving, at the controller, a validation request for the IoT device from an IoT management platform, wherein the validation request includes an earlier timestamp and the corresponding historical hash value previously stored in the blockchain ledger;

polling the IoT device to provide the historical sensor value associated with the earlier timestamp of the validation request;

retrieving the heartbeat token associated with the earlier timestamp of the validation request;

calculating, at the controller, a reconstructed hash value based upon the historical sensor value provided by the IoT device and the heartbeat token associated with the earlier timestamp from the validation request; and comparing the historical hash value stored in the blockchain ledger and the reconstructed hash value, and when the historical hash value matches the reconstructed hash value, determining that the IoT device is valid or when the historical hash value does not match the reconstructed hash value, identifying the IoT device as blacklisted in the blockchain ledger.

* * * * *